United States Patent [19]

DiSalvo et al.

[11] Patent Number: 5,375,875
[45] Date of Patent: Dec. 27, 1994

[54] TWO STAGE CUTTER ARRANGEMENT FOR FORMING AN AIR BAG DEPLOYMENT OPENING

[75] Inventors: Anthony J. DiSalvo, Allen Park; David J. Bauer, West Bloomfield; Kenneth J. Barnes, Shelby Township, Macomb County, all of Mich.

[73] Assignee: Tip Engineering Group, Inc., Farmington Hills, Mich.

[21] Appl. No.: 132,299

[22] Filed: Oct. 5, 1993

[51] Int. Cl.$^5$ .............................................. B60R 21/16
[52] U.S. Cl. ................................... 280/728 B; 280/732
[58] Field of Search ............... 280/728 A, 728 B, 732, 280/743 R

[56] References Cited

U.S. PATENT DOCUMENTS

| | | | |
|---|---|---|---|
| 4,989,896 | 2/1991 | DiSalvo et al. | 280/728 B |
| 5,035,444 | 7/1991 | Carter | 280/728 B |
| 5,046,758 | 9/1991 | Rafferty et al. | 280/728 B |
| 5,108,128 | 4/1992 | Parker et al. | 280/728 B |
| 5,154,444 | 10/1992 | Nelson | 280/732 |
| 5,280,947 | 1/1994 | Cooper | 280/728 B |

*Primary Examiner*—Kenneth R. Rice
*Attorney, Agent, or Firm*—John R. Benfiel

[57] ABSTRACT

An arrangement for forming an air bag deployment opening in a vinyl covered trim piece in which one or more hinged deployment door substrates are formed with an upwardly turned rim extending about the unhinged sides which exerts a second stage cutting pressure on the inside of a covering vinyl layer. A first stage piercing cutter panel is also hinged along the same side but inclined downwardly to be initially contacted by the inflating air bag. An array of piercing elements formed on the cutter panel are forced through the vinyl covering layer prior to movement of the door substrate panel to pierce the covering layer at the center and corners of the door pattern prior to progressive cutting by the door panel rim.

7 Claims, 5 Drawing Sheets

TWO STAGE CUTTER ARRANGEMENT FOR FORMING AN AIR BAG DEPLOYMENT OPENING

BACKGROUND OF THE INVENTION

This invention concerns air bag safety, systems and more particularly arrangements for providing air bag deployment openings in an interior trim structure, i.e., instrument panels, in which the outer surface does not give any visible indication of an air bag deployment door or opening.

Air bag systems have now come into common use for automotive vehicles, in which one or more air bags are stowed in respective storage spaces located within the passenger compartment. Typically, a driver's side air bag is stored in a receptacle in the center of the steering wheel and a passenger's side air bag is stored in a receptacle mounted behind the instrument panel. Upon detection of a relatively severe collision, the air bag or bags are very rapidly inflated and enter the passenger compartment to be deployed in positions within the passenger compartment so as to cushion the driver and/or passengers from injury which otherwise would be caused by impacting the interior structure of the auto.

The air bags must be neatly stowed out of sight and so as to be resistant to tampering, yet able to deploy into the passenger compartment in an instant. These requirements necessitate a sturdy closure panel for the deployment opening, preferably installed so as to minimize so as to any visual indication of the presence of the closure, and yet to reliably open under the wide range of ambient temperature conditions for which the auto is designed for use, over the entire useful life of the car (or truck).

Such closures are usually opened by a force exerted by the inflating air bag, and the deployment of the air bag must not be appreciably slowed by resistance developed in opening the closure. The considerable force applied by the inflating air bag must not result in fragmentation or separation of the closure, lest debris be projected towards persons in the passenger compartment.

The closure is of necessity exposed within the auto interior, and thus must be aesthetically compatible with the auto interior trim.

A vinyl skin covering layer is commonly applied to the instrument panel and other trim panel surfaces. Plastics such as vinyl, while durable, are relatively tough and resistant to tearing.

There has heretofore been proposed such closures in which doors are formed by a substrate panel overlain by a vinyl or covering layer skin, with the vinyl severed by the deploying air bag forcing the substrate panels against the inside of the covering layer. While preweakening of the covering layer has been utilized to facilitate severing, it is difficult to achieve reliable severing of this material at the appropriate force level.

U.S. Pat. No. 3,640,546 discloses a closure in which a pair of doors are covered by a covering skin, preweakened along a line of separation; which is ruptured when the doors are forced opened by the deploying air bag. The line of weakening is described as being accomplished by a reduction in thickness, perforating, or of heating. Such a joint is not sufficiently sturdy to resist inward pressure applied by an occupant and also results in a visible seam.

Various approaches have heretofore been devised to provide reliable severing of a vinyl covering layer for this purpose. See U.S. Pat. Nos. 4,991,870; 5,080,393; and 5,217,244, in which energy generating means are employed to degrade the vinyl skin over an air bag deployment opening.

Movable piercing cutters have also been proposed, see for example U.S. Pat. No. 4,989,896 which describes a piecing cutter positioned to be forced out by the air bag during deployment to penetrate the vinyl skin.

However, the remaining skin sections are severed by the pressure operated by the door being pushed open.

Another design challenge associated with piercing type cutters is to effectively transfer the energy of the inflating air bag to the cutters without disturbing the proper deployment of the air bag. Small area piercing point actuation cannot quickly and effectively absorb the pressure exerted by the air bag, since the area of the air bag is so much greater.

Also heretofore proposed is a "cookie cutter" type of device, as described in U.S. Pat. No. 5,035,444, in which a large area pivoted cutter is swung out by contact with the inflating air bag. The cutter has a series of edges which are arranged in the shape of the deployment door free sides.

The vinyl covering layer is particularly difficult to cut when ambient conditions have heated it to an elevated temperature as the material tends to stretch considerably. Substantial loading is required to cut with the cutter shown in U.S. Pat. No. 5,035,444 when stretching occurs, and delayed completion of the cutting will retard air bag deployment and thus degrade or defeat the performance of the air bag system.

Further, the use of an extensive length of sharp cutting edge, directed outwardly, creates a possible danger to an occupant sought to be protected by the air bag.

Accordingly, the object of the present invention is to provide a mechanical arrangement for reliably cutting a vinyl covering layer to form an air bag deployment opening which arrangement completely and quickly cuts the covering layer in a pattern matching the deployment door sides, while minimizing the loading required to complete the severing of the covering layer. The object also is to minimize the hazards to the occupants by operation of the cutter.

SUMMARY OF THE INVENTION

The present invention is an arrangement which carries out a two-stage cutting action of the covering layer, comprising the combination of a first stage cutter comprised of an array of pointed end piercing cutter elements carried by a pivoted cutter a major portion thereof inclined to extend below the interior side thereof to a level much closer to the stored air bag. The cutter panel is positioned to immediately be pushed up by the inflating air bag, the piercing cutters completing a penetration of the covering layer as the cutter panel moves into abutment against the inside of the door substrate panel by the inflating air bag in the initial stage of the air bag system operation.

The piercing cutter elements are shaped to have a stiffened construction to prevent bending and insure that penetration of the covering layer occurs at particular locations above the substrate door panel within the pattern in which the covering layer is to be severed, as at the center and corners of the door severing pattern.

The second stage cutter is comprised by the door substrate itself, formed with an out turned rim forming a blunted shearing edge, the rim extending about the unhinged sides of the door substrate panel which rim exerts pressure on the inside of the covering layer along the severing pattern to progressively sever the covering layer in the door pattern perimeter remaining after penetration thereof by the piercing points of the array of piercing cutter elements.

The rim edge on the door substrate panel projects upwardly from the panel perimeter to a close spacing beneath the covering layer. The rim is formed over to blunt the edge and minimize the danger that an occupant could be cut as the door is rapidly swung open by the air bag inflation.

DETAILED DESCRIPTION

Figure 1:
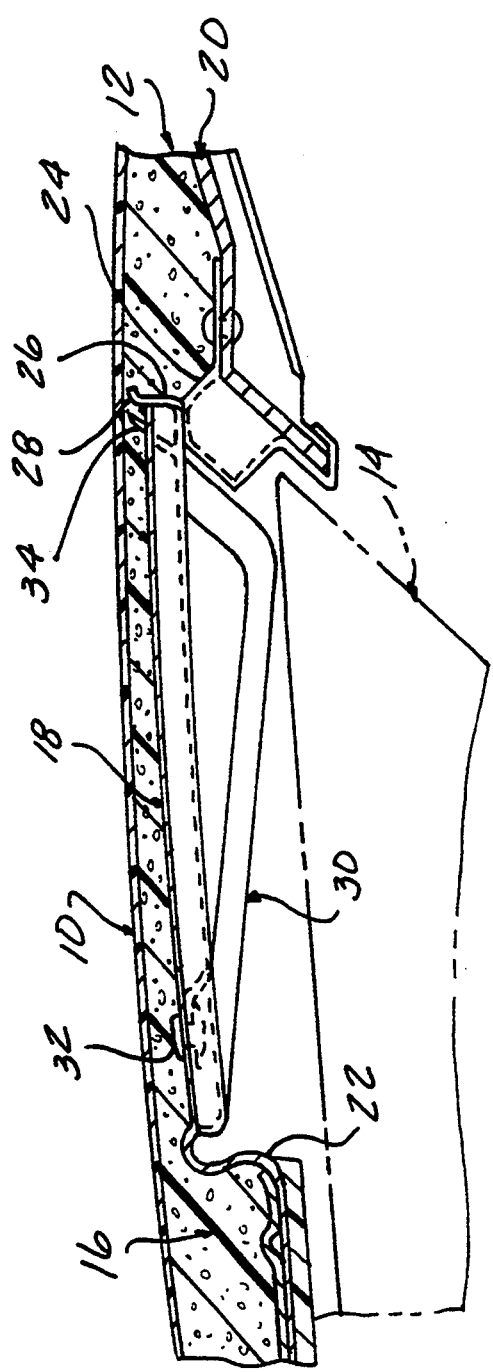
FIG. 1 is a sectional view of a U-shaped air bag deployment door incorporating the two stage cutter arrangement according to the present invention.

In the following detailed description, certain specific terminology will be employed for the sake of clarify and a particular embodiment described in accordance with the requirements of 35 USC 112, but it is to be understood that the same is not intended to be limiting and should not be so construed inasmuch as the invention is capable of taking many forms and variations within the scope of the appended claims.

As discussed above, the present invention concerns air bag safety systems in which an air bag is stowed in a folded condition behind an interior trim structure, such as the instrument panel for passenger side air bag applications.

The air bag is rapidly inflated upon detection cf a severe collision, with an opening formed into the interior trim structure to allow the air bag to expand into the passenger space just to the rear of the trim structure. The embodiment of FIGS. 1-4 is applied to an instrument panel installation and for a so-called top mounted U-pattern deployment door in which a generally U-shaped door is forced to hinge open along a hinging axis extending across the vehicle width and generally along the direction in which the instrument panel extends.

The present invention also concerns the so-called "invisible seam" deployment door construction in which no outline of the deployment door or opening is visible from the exterior of the trim piece such as to not encourage tampering and to not make obvious the presence of the air bag to occupants of the vehicle.

In this type of construction, an overlying smooth expanse of a decorative cover layer 10 extends completely over the opening to be formed and over the adjacent regions of the instrument panel 12, here comprising the trim piece behind which an air bag container 14 is mounted. The decorative covering layer 10 is underlain by a layer of foam 16 such as to create the smooth uninterrupted contour of the outer upper surface of the instrument panel 12.

The deployment door is essentially defined by a generally rectangular door substrate panel 18 which is free from any connection to the substrate layer 20 of the instrument panel 12 along three of its four sides but having its fourth side connected to a hinging flange 22 extending along the forward side of the deployment door substrate panel 18.

The unhinged opposite side of the deployment door substrate panel 18 rests on a stop structure 24 secured to a portion of the instrument panel substrate 20 as shown in FIG. 1. This enables the door substrate panel 18 to resist inward pushing pressure while allowing the outward hinging action about the hinge flanqe 22 upon activation of the air bag system.

According to one aspect of the present invention, the door substrate panel 18 is formed as a second stage cutter by means of an upturned rim 26 extending about the perimeter of the three free sides of the door substrate panel 18. The rim 26 is blunted with a turned out final edge 28 to avoid the presentment of a sharp cutting edge towards the interior of the vehicle passenger compartment while still allowing a concentration of pressure to be applied by the force of the inflating air bag exerted on the substrate panel 18. The rim 26 is closely spaced to the inside of the covering layer 10, i.e., 0.060 inches below the inner surface thereof.

According to another aspect of the present invention, a first stage piercing cutter panel 30 is provided which is approximately coextensive with the door substrate panel 18. The first stage cutter panel 30 is also hinged along its forward side by means of a series of connections 32 to the door substrate panel 18. The normal position of the first stage cutter panel 30 is angled downwardly below the undersurface of the substrate door panel inclined downwardly from the hinging side towards the free side of the door substrate panel 18.

The first stage cutter panel 30 is provided with an array of upwardly projecting piercing elements 34 having peaked piercing points 36 which are located to intersect the vinyl or other decorative covering layer 10 along the same line as will be contacted by the upturned rim 26 of the door substrate panel 18 when the panel 18 is forced up.

The piercing elements 34 have suitable reenforcing formations 38 to ensure that the elements 34 are sturdy enough to maintain their location even after being forced through the foam layer 16 and against the covering layer 10 by the pressure exerted by the inflating air bag such as to provide for piercing of the vinyl covering layer 10 at the appropriate locations.

The piercing peaks 36 are located in the center of the free side of the door substrate panel 18 and adjacent each of the corners formed at the intersection of the free sides of the deployment door substrate panel 18. These are the locations where it is most difficult to initiate and/or maintain severing of the covering layer 10, and thus a "prepenetration" aids the action of the second stage cutting.

The initial location of the first stage cutter panel 30 is substantially closer to the inflated air bag than the door panel 18, and thus is almost immediately contacted by the air bag upon inflation, the first stage cutter panel 30 first forced upwardly, penetrating the vinyl covering layer 10 at the center and corners before the door substrate panel 18 begins to open and apply pressure to the covering layer 10.

The characteristic of vinyl sheet material, particularly under high ambient temperature conditions makes it difficult to sever by means of an applied pressure since it tends to stretch considerably. At the same time, it is critical that the severing of the vinyl be completed quickly and reliably under a wide range of temperature conditions as any impeding or delay in the deployment of the air bag will seriously affect the performance of the air bag safety system due to a mispositioning of the air bag or a failure to complete its inflation prior to contact with the occupant of the vehicle.

Figure 4:
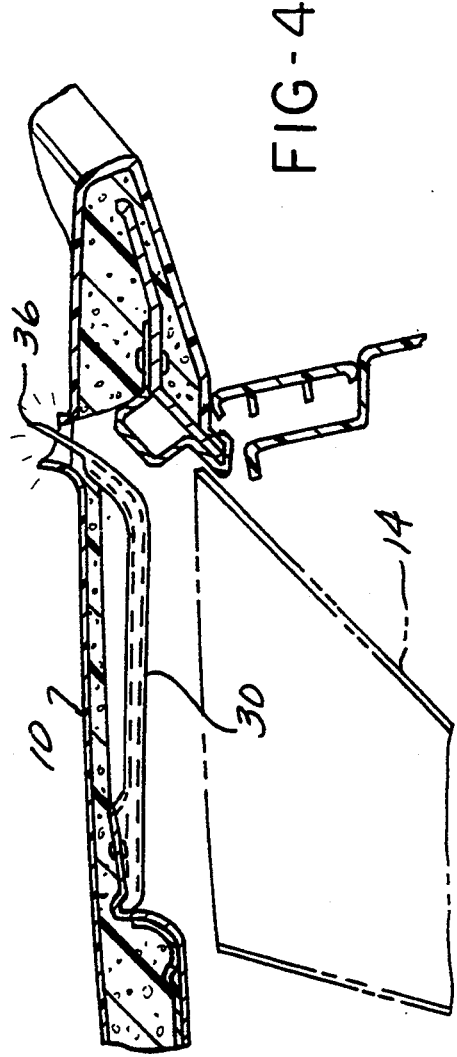
FIG. 4 is a partially exploded sectional view of the deployment door and cutter components and adjacent instrument panel structure, with the first stage cutter advanced by the air bag against the deployment door substrate.

The piercing elements 34 are each received into a respective aligned cut-out opening 40 in the deployment door substrate panel 18. Thus, the first stage cutter panel 30 will bottom out against the undersurface of the deployment door substrate panel 18 as indicated in FIG. 4 after piercing the vinyl decorative covering layer 10 at these three points.

After completion of this stage, the deployment door substrate panel 18 progressively continues the severing of the vinyl covering layer 10 by pressure developed by the upturned rim 26 as the deployment door panel 18 swings open about the hinge flange 22 under the pressure of the inflating air bag. Once the vinyl covering layer 10 has been pierced continued progressive cutting is readily achieved by the deployment door substrate panel.

Figure 3:
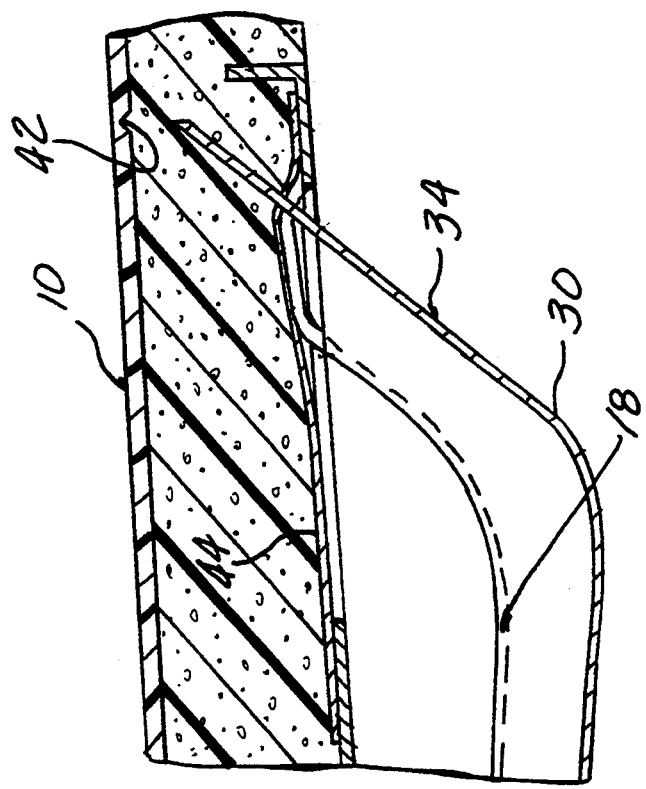
FIG. 3 is an enlarged sectional view of the deployment door and cutter components and adjacent instrument panel structure.
Figure 2:
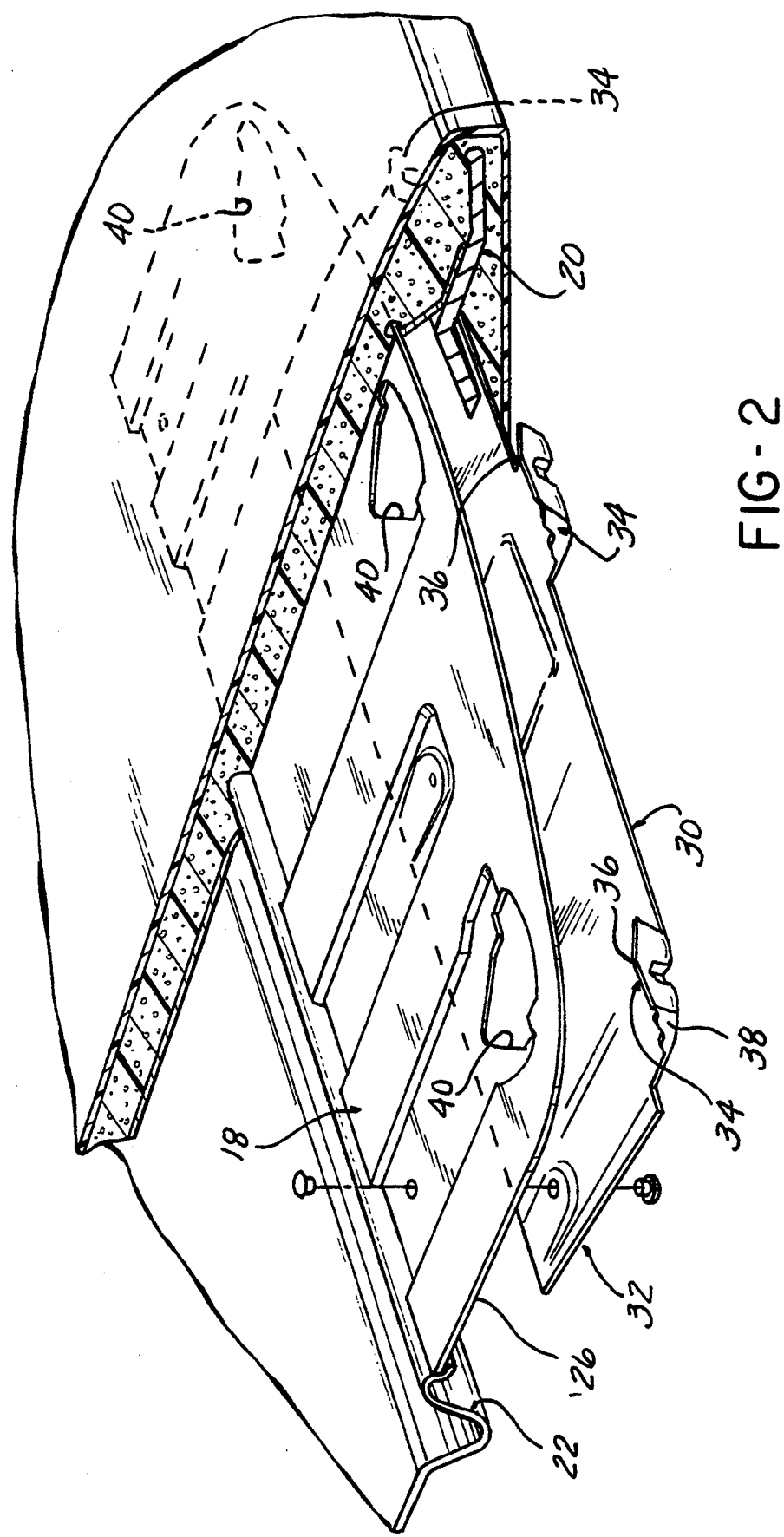
FIG. 2 is a perspective, partially exploded view of the cutter arrangement components of FIG. 1 and a fragmentary view of adjacent instrument panel parts.

As seen in FIG. 3, a groove 42 is cut into the inside of the vinyl covering layer 10, extending along the line of severing of the vinyl covering layer 10 as by scoring, etching, laser cutting, etc., in order to further insure a reliable cutting of the vinyl in the predetermined pattern which will allow the swinging open of the deployment door and the formation of the deployment opening for enabling the air bag to move into the passenger compartment.

Also shown in FIG. 3, is a tape foam seal 44 which can be used to overlie the cut-out openings 40 during the foam molding process in order to prevent the escape of foam and yet allow the piercing element 34 to move upwardly. The foam presents only minimal resistance.

Figure 6:
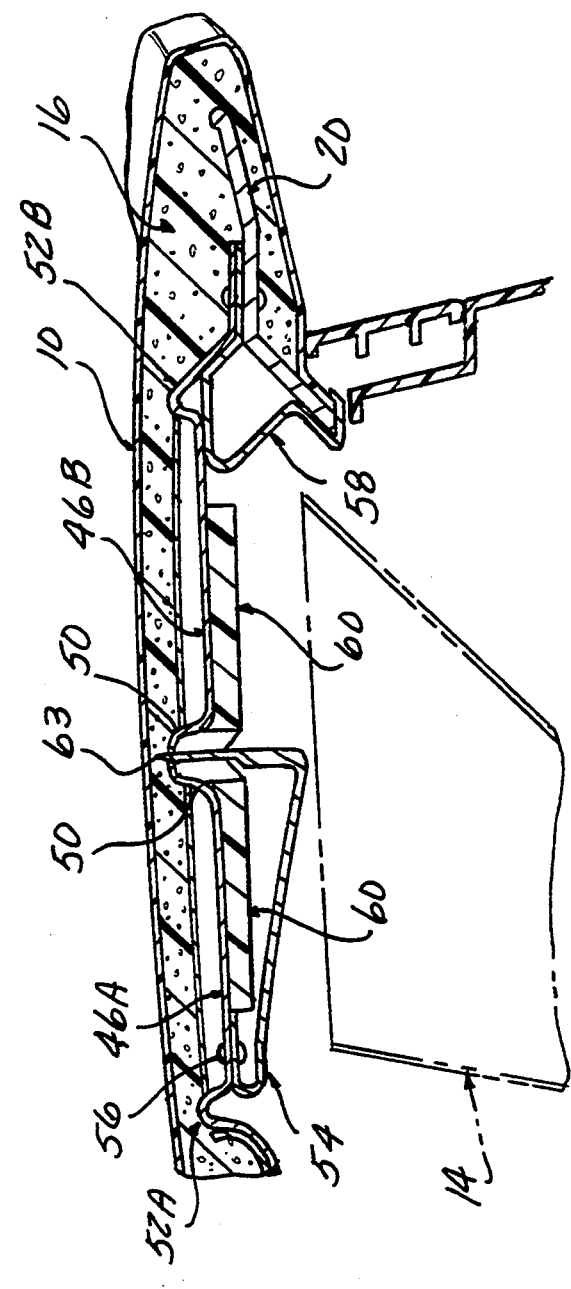
FIG. 6 is a sectional view of the "H" pattern components with the first stage cutter advanced to the penetrating position.
Figure 5:
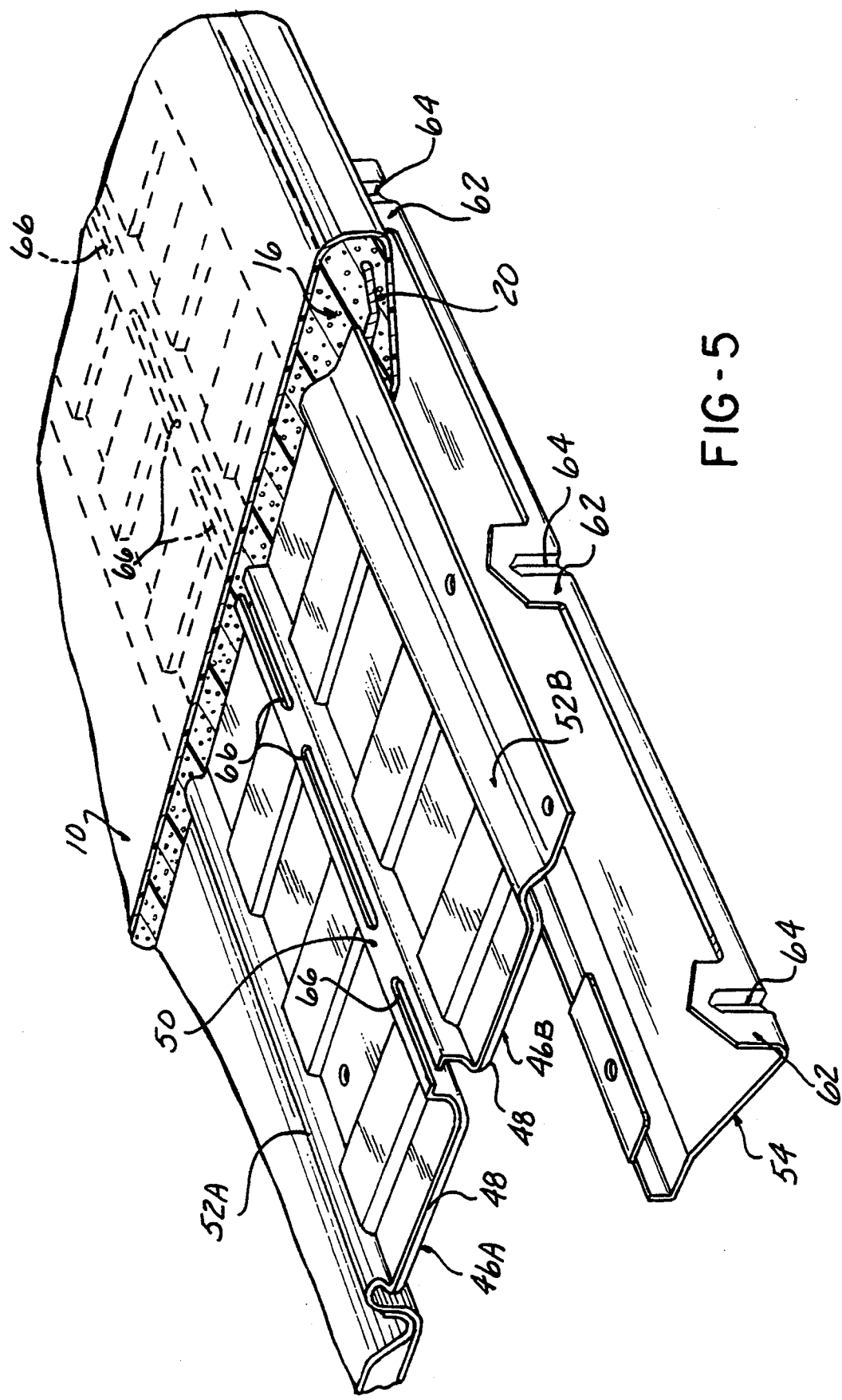
FIG. 5 is a perspective view of an "H" pattern first stage cutter and second state door substrate cutter together with a fragmentary sectional view of adjacent instrument panel structure.
Figure 7:
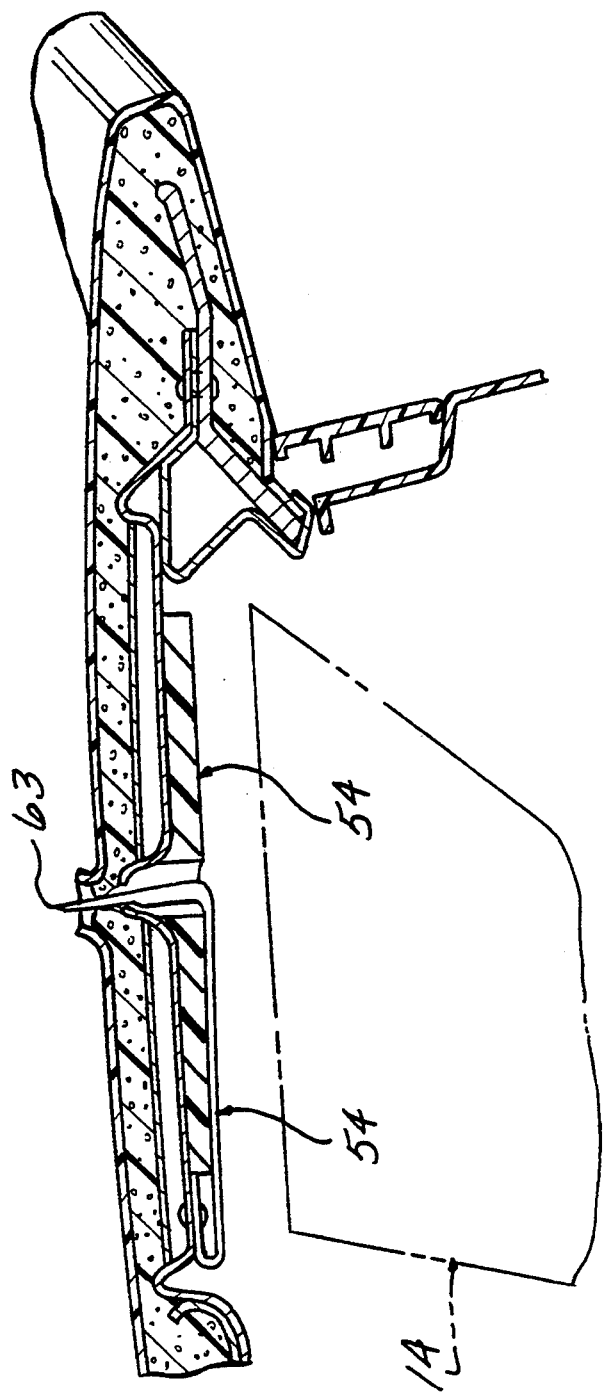
FIG. 7 is a sectional view of the "H" pattern two stage cutter arrangement.

The invention is also applicable to other door patterns such as the "H" pattern shown in FIGS. 5-7. In this instance, a pair of deployment door substrate panels 46A, 46B are provided, hinged by curved sections 59 along one side of the instrument panel substrate 20. Each side of the deployment door substrate panels 46A, 46B has an upturned rim 48 extending along the unhinged sides thereof. The deployment door panels 46A, 46B are also joined along their common side by a slotted ridge 50 which defines a frangible edge and also provides a further elevated upturned rim along the side of each deployment door substrate panel 46A, 46B opposite a hinging side 52A, 52B.

In this design, a first stage cutter panel 54 is provided, substantially coextensive with the deployment door substrate panel 46A, and which cutter panel is similar to the above-described "U" door pattern, hinged on one side by a series of riveted connections 56. The reverse bend formation of that side of the first stage cutter panel 54 provides a hinging action. The first stage cutter panel 54 as in the above-described embodiment is inclined downwardly towards the air bag canister 14 as it extends towards the junction of the two deployment door substrate panels 46A, 46B.

In this design, a knee stop 58 is provided to provide support for the connected deployment doors 46A, 46B substrate panels against inward pressure. Each of the substrate panels is reinforced by means of a layer 60 of a rigid foam plastic such as DYTHERM (TM).

The first stage cutter panel 54 is similarly provided with a series of piercing elements 62 suitably reinforced to be relatively stiff and resistant to bending as by the ribbed formation 64. Each element 62 extends through one of two slots 66 in the raised ridge 50 so as to be able to be moved upwardly and to have peaks 63 which penetrate the vinyl covering layer 10 as the first stage cutter panel 54 is swinging against the undersurface of the substrate door panels 46A, 46B as shown in FIG. 7.

Continued inflation of the air bag forces the deployment doors panels 46A, 46B to swing open along their respective hinges 52A, 52B breaking the interconnecting regions of the upturned regions between the slots 62 and with the upturned rim exerting progressive pressure on the remaining portions of the covering vinyl layer 10 such as to complete the severing of the vinyl layer 10. The vinyl covering layer 10 is preferably grooved along the inside in the pattern of the door openings to ensure ready severing of the vinyl skin along the correct pattern.

Accordingly, it can be appreciated that the two stage cutter arrangement provides a highly reliable initiation and completion of the vinyl covering layer severing process, and yet avoids the use of a much more extensive sharp cutting edge as a relatively blunt cutter can be employed to complete the progressive cutting action, and yet maintaining a high degree of reliability in the cutting action over a wide range of temperature conditions.

We claim:

1. An arrangement for forming an air bag deployment opening in a trim piece of a passenger compartment of a vehicle, said trim piece having an air bag stored in a canister mounted behind a section thereof, the arrangement comprising:

a trim piece substrate panel formed with an opening located over said air bag canister;

at least one deployment door substrate panel fit within said opening in said trim piece substrate panel, said door substrate panel formed with a plurality of sides, one side thereof hinged to said trim piece substrate along the perimeter of said opening, the other sides thereof free to allow said door substrate panel to swing out of said trim piece substrate opening;

a covering layer extending over the outside of said trim piece and said door substrate panel;

a first stage cutter comprising a cutter panel having sides substantially coextensive with said door substrate panel, cutter panel lying inside said door substrate panel and hinged along the same side as said door substrate panel, initially swung inwardly from said door substrate of piercing elements extending outwardly from said cutter page each element having a piercing point located to contact the inside of said covering layer at points on said pattern along said door substrate panel sides when said cutter panel is swung outward to abut said door substrate panel and said piercing points are thereby brought into contact with the inside of said covering;

an out turned perimeter rim formed along the perimeter of said other sides of said door substrate panel extending outward to a level adjacent to the inside of said covering layer, whereby said rim of said door substrate panel can apply a second stage severing pressure on said covering layer after penetration by said first stage cutter piercing elements in a pattern defined by said other unhinged sides thereof as said air bag forces said substrate door panel to hinge open upon inflation of said air bag.

2. The arrangement according to claim 1 wherein said cutter panel is mounted to be inclined outwardly from said hinged side to be positioned closer to said stored air bag than said door substrate panel.

3. The arrangement according to claim 2 wherein said door substrate panel and said cutter panel are generally rectangular, with one hinged side, a free side opposite said hinged side and two free connecting sides connecting the ends of the hinged and opposite sides thereof, and wherein three cutter elements are provided, one formed adjacent each corner formed by said opposite side and each of said connecting sides, and one formed intermediate the lengths of said opposite side.

4. The arrangement according to claim 2 wherein each of said piercing elements extends through corresponding openings in said door substrate panel.

5. The arrangement according to claim 4 wherein a second deployment door substrate panel is included fit into said trim piece substrate opening, said second door substrate panel having a plurality of sides, one side thereof hinged to said trim piece substrate opening opposite said hinged side of said first mentioned door substrate panel, said first mentioned and said second door substrate panel having a common joined out turned rim extending along sides thereof opposite the respective hinged sides of each door substrate panel, a series of slots in said common joined rim comprising said openings receiving said piercing elements of said cutter panel.

6. The arrangement according to claim 2 further including a layer of foam interposed between said covering layer and said trim piece substrate and said door substrate panel.

7. The arrangement according to claim 1 wherein said door substrate panel rim has a terminal edge turned over to present a blunted shape.

* * * * *